United States Patent

Curtis et al.

[11] Patent Number: 5,713,585
[45] Date of Patent: Feb. 3, 1998

[54] SAFETY BRAKE STROLLER

[76] Inventors: Greg M. Curtis; Nigel Price, both of 3915 Sharon Pl., West Vancouver, BC, Canada, V6T 4T2

[21] Appl. No.: 565,962

[22] Filed: Dec. 4, 1995

[51] Int. Cl.[6] .................................................. B62B 9/08
[52] U.S. Cl. ........................... 280/47.38; 188/20; 188/31
[58] Field of Search .......................... 280/87.051, 642, 280/647, 47.38, 33.994; 188/2 F, 20, 31

[56] References Cited

U.S. PATENT DOCUMENTS

| 784,443 | 3/1905 | Starbard | 188/20 |
|---|---|---|---|
| 1,861,958 | 6/1932 | Gallinant | 188/20 |
| 2,425,574 | 8/1947 | Stewack | 188/31 |
| 2,958,537 | 11/1960 | Young | 188/20 |
| 3,501,164 | 3/1970 | Peterson | 280/33.994 |
| 4,018,449 | 4/1977 | Anderson | 280/33.994 |
| 4,618,033 | 10/1986 | Kassai | 280/642 |
| 5,370,408 | 12/1994 | Eagan | 188/20 |

FOREIGN PATENT DOCUMENTS

| 0509786 | 10/1992 | European Pat. Off. | 280/33.994 |
|---|---|---|---|
| 0128762 | 5/1991 | Japan | 280/647 |
| 6704514 | 10/1967 | Netherlands | 280/33.994 |
| 2243198 | 10/1991 | United Kingdom | 280/47.38 |
| 2277565 | 11/1994 | United Kingdom | 280/47.38 |

*Primary Examiner*—Brian L. Johnson
*Assistant Examiner*—Min Yu

[57] ABSTRACT

A stroller for precluding motion of the stroller absent an attendant walking therebehind. The inventive device includes a stroller having a plurality of wheels. A brake handle is movably mounted to the push handle of the stroller for being grasped during manual propulsion of the stroller. Brake assemblies are mechanically coupled to the brake handle for precluding rotation of the wheels during an absence of an attendant gripping the brake handle to preclude unintentional rolling of the stroller.

4 Claims, 3 Drawing Sheets

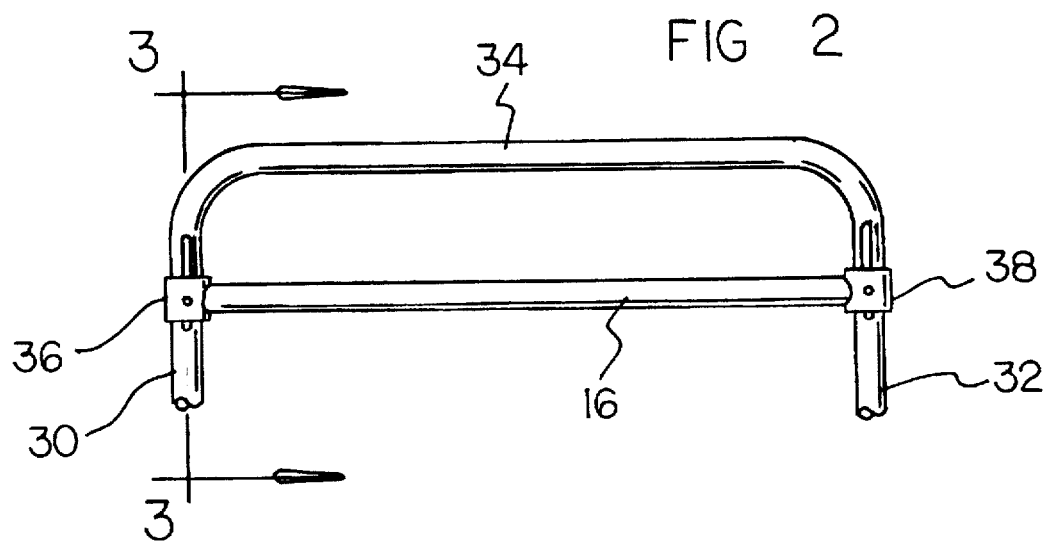
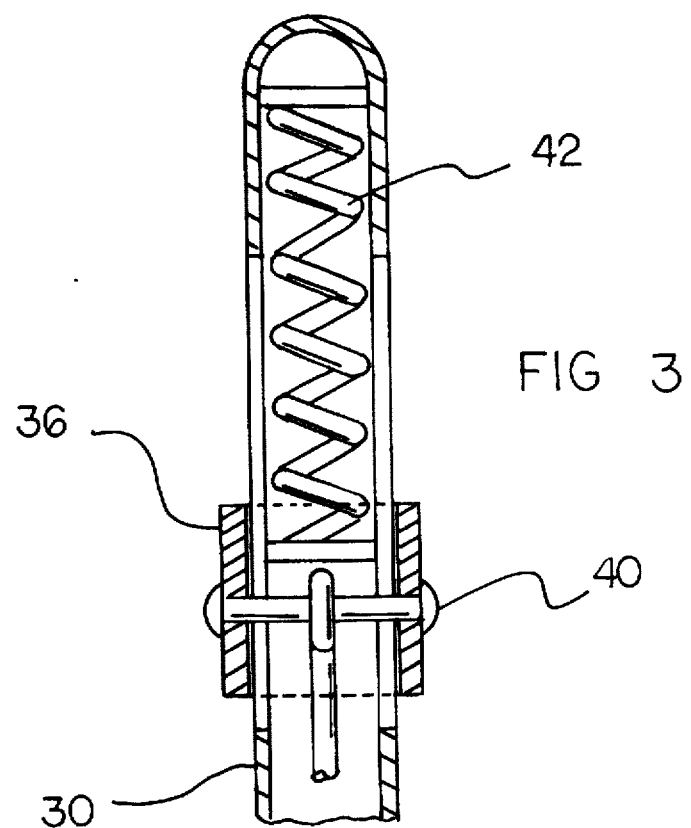

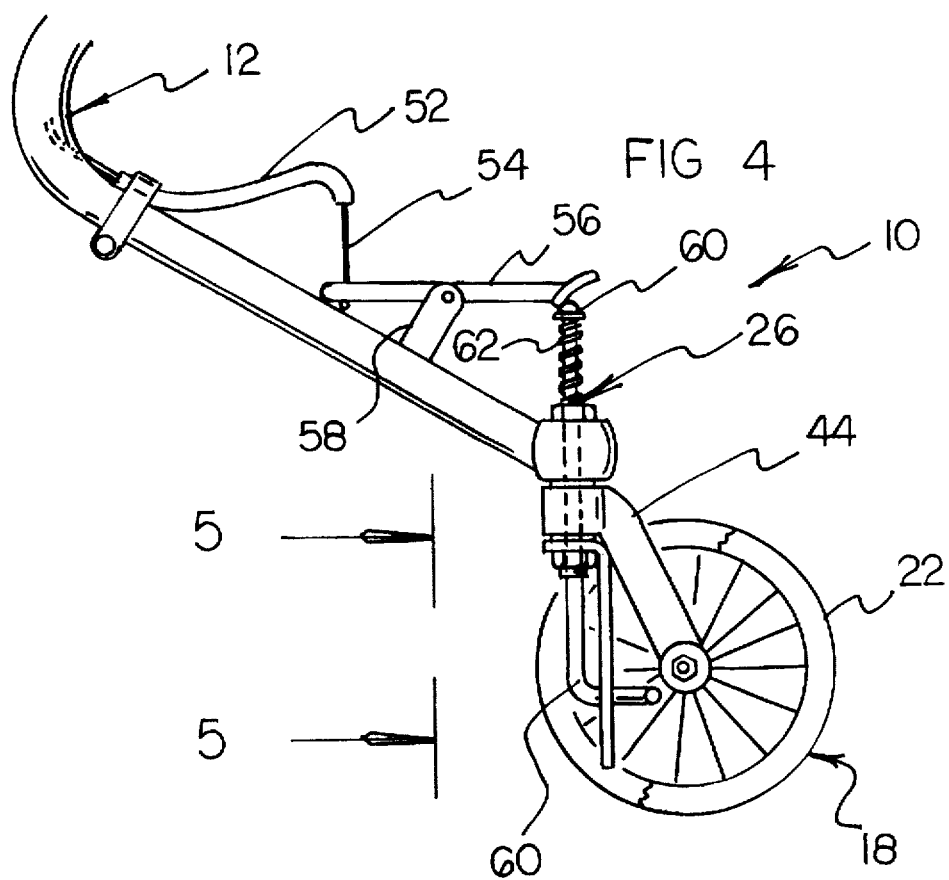
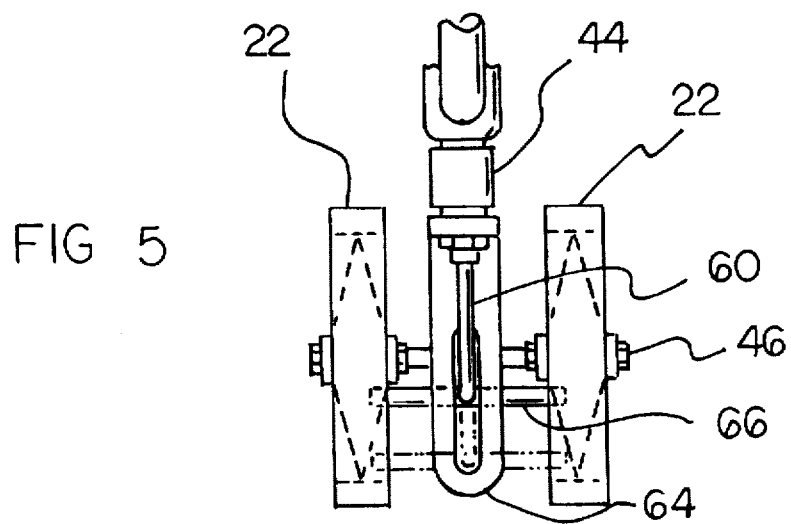

SAFETY BRAKE STROLLER

BACKGROUND OF THE INVENTION

1. Field of the Invention

The present invention relates to infant stroller structures and more particularly pertains to a safety brake stroller for precluding motion of the stroller absent an attendant walking therebehind.

2. Description of the Prior Art

The use of infant stroller structures is known in the prior art. More specifically, infant stroller structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art infant stroller structures include U.S. Pat. Nos. 4,322,093; 5,020,560; 4,579,359; 5,199,534; 5,253,882; and 4,211,309.

While these devices fulfill their respective, particular objectives and requirements, the aforementioned patents do not disclose a safety brake stroller for precluding motion of the stroller absent an attendant walking therebehind which includes a stroller having a plurality of wheels, a brake handle movably mounted to the push handle of the stroller for being grasped during manual propulsion of the stroller, and brake assemblies mechanically coupled to the brake handle for precluding rotation of the wheels during an absence of an attendant gripping the brake handle to preclude unintentional rolling of the stroller.

In these respects, the safety brake stroller according to the present invention substantially departs from the conventional concepts and designs of the prior art, and in so doing provides an apparatus primarily developed for the purpose of precluding motion of the stroller absent an attendant walking therebehind.

SUMMARY OF THE INVENTION

In view of the foregoing disadvantages inherent in the known types of infant stroller structures now present in the prior art, the present invention provides a new safety brake stroller construction wherein the same can be utilized for precluding motion of the stroller absent an attendant walking therebehind. As such, the general purpose of the present invention, which will be described subsequently in greater detail, is to provide a new safety brake stroller apparatus and method which has many of the advantages of the infant stroller structures mentioned heretofore and many novel features that result in a safety brake stroller which is not anticipated, rendered obvious, suggested, or even implied by any of the prior art infant stroller structures, either alone or in any combination thereof.

To attain this, the present invention generally comprises a stroller for precluding motion of the stroller absent an attendant walking therebehind. The inventive device includes a stroller having a plurality of wheels. A brake handle is movably mounted to the push handle of the stroller for being grasped during manual propulsion of the stroller. Brake assemblies are mechanically coupled to the brake handle for precluding rotation of the wheels during an absence of an attendant gripping the brake handle to preclude unintentional rolling of the stroller.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new safety brake stroller apparatus and method which has many of the advantages of the infant stroller structures mentioned heretofore and many novel features that result in a safety brake stroller which is not anticipated, rendered obvious, suggested, or even implied by any of the prior art tool guides, either alone or in any combination thereof.

It is another object of the present invention to provide a new safety brake stroller which may be easily and efficiently manufactured and marketed.

It is a further object of the present invention to provide a new safety brake stroller which is of a durable and reliable construction.

An even further object of the present invention is to provide a new safety brake stroller which is susceptible of a low cost of manufacture with regard to both materials and labor, and which accordingly is then susceptible of low prices of sale to the consuming public, thereby making such safety brake strollers economically available to the buying public.

Still yet another object of the present invention is to provide a new safety brake stroller which provides in the apparatuses and methods of the prior art some of the advantages thereof, while simultaneously overcoming some of the disadvantages normally associated therewith.

Still another object of the present invention is to provide a new safety brake stroller for precluding motion of the stroller absent an attendant walking therebehind.

Yet another object of the present invention is to provide a new safety brake stroller which includes a stroller having a plurality of wheels, a brake handle movably mounted to the push handle of the stroller for being grasped during manual propulsion of the stroller, and brake assemblies mechanically coupled to the brake handle for precluding rotation of the wheels during an absence of an attendant gripping the brake handle to preclude unintentional rolling of the stroller.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an enlarged elevation view of a portion of the present invention.

FIG. 3 is a cross sectional view taken along line 3—3 of FIG. 2.

FIG. 4 is an enlarged elevation view of a further portion of the present invention.

FIG. 5 is an elevation view taken from line 5—5 of FIG. 4.

DESCRIPTION OF THE PREFERRED EMBODIMENT

Figure 1:
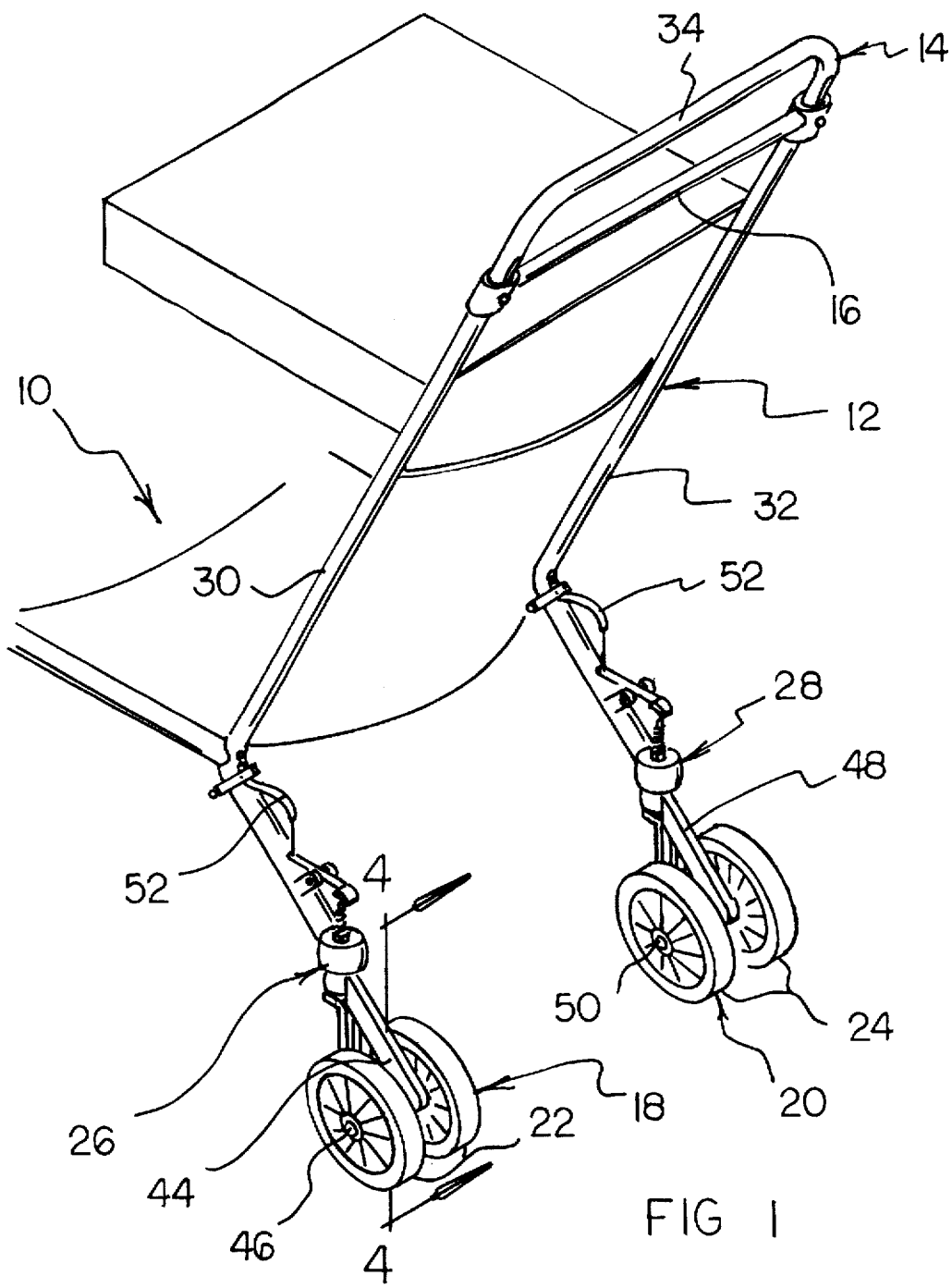
FIG. 1 is an isometric illustration of a safety brake stroller according to the present invention.

With reference now to the drawings, and in particular to FIGS. 1-5 thereof, a new safety brake stroller embodying the principles and concepts of the present invention and generally designated by the reference numeral 10 will be described.

More specifically, it will be noted that the safety brake stroller 10 comprises a stroller assembly 12 having a push handle 14 projecting upwardly from an unlabeled seat within which an infant or other individual can reside during use of the device 10. A brake handle 16 is movably mounted relative to the push handle 14 substantially as shown in FIG. 1 of the drawings. The stroller assembly 12 further includes a first wheel assembly 18 and a second wheel assembly 20 which cooperate with further unillustrated wheels to permit rolling traversing of the stroller assembly 12 over a ground surface. The first wheel assembly 18 includes a first pair of wheels 22, and the second wheel assembly 20 similarly includes a second pair of wheels 24. A first brake means 26 is mounted to the stroller assembly 12 and positioned in mechanical communication with the brake handle 16 for selectively precluding rotation of the first pair of wheels 22. Similarly, a second brake means 28 can also be provided with the present invention 10 and mounted to the stroller assembly 12 in mechanical communication with the brake handle 16 for selectively precluding rotation of the second pair of wheels 24. By this structure, an individual manually propelling the stroller assembly 12 can grasp the brake handle 16 to effect releasing of the brake means 26 and 28 to permit rotation of the wheels 22 and 24 of the respective wheel assemblies 18 and 20. However, in an absence of a pushing attendant manipulating the brake handle 16, the brake means 26 and 28 will automatically engage the wheels 22 and 24 of the wheel assemblies 18 and 20 so as to preclude further motion of the stroller assembly 12.

As best illustrated in FIGS. 1 through 3, it can be shown that the push handle 14 of the present invention 10 preferably comprises a first vertical handle tube 30 projecting upwardly from the stroller assembly 12, and a second vertical handle tube 32 similarly projecting upwardly from the stroller assembly. A gripping handle tube 34 extends between the vertical handle tubes 30 and 32 and is oriented in a substantially horizontal position. As shown in FIG. 2, the brake handle 16 preferably comprises an unlabeled elongated member having a first handle collar 36 extending from a first end thereof and slidably positioned about the first vertical handle tube 30. A second handle collar 38 projects from a second end of the elongated member of the brake handle 16 and is slidably positioned about the second vertical handle tube 32. As shown in FIG. 3, each of the handle collars 36 and 38 includes a guide pin 40 projecting through an elongated slot formed in the respective vertical handle tube 30 or 32. A return spring 42 is interposed between the guide pin 40 and an upper portion of the respective vertical handle tube 30 or 32 so as to bias the brake handle 16 into a spaced orientation relative to the gripping handle tube 34. By this structure, an individual can grasp the gripping handle tube 34 and the brake handle 16 simultaneously, whereby the brake handle 16 can be pulled towards the gripping handle tube 34 against a force the return 42 so as to actuate the brake means 26 and 28 as will subsequently be described in more detail.

Referring now to FIGS. 4 and 5 with concurrent reference to FIG. 1, it can be shown that the stroller assembly 12 further comprises a first axle support stanchion 44 rotatably mounted to the stroller assembly 12 and projecting therefrom to support a first axle 46, with the first pair of wheels 22 being rotatably mounted to the first axle 46 on opposed sides of the first axle support stanchion 44. Similarly, a second axle support stanchion 48 is rotatably mounted to the stroller assembly 12 and extends therefrom to support a second axle 50 with the second pair of wheels 24 being rotatably mounted to the second axle on opposed sides of the second axle support stanchion 48. By this structure, the wheel assemblies 18 and 20 are permitted to rotatably articulate relative to the stroller assembly 12.

As shown in FIGS. 4 and 5 for the first brake means 26, the brake means 26 and 28 each comprise a rigid cable conduit 52 secured to a portion of the stroller assembly 12 which supports a cable 54 extending through the rigid cable conduit. A lever 56 is pivotally supported relative to a portion of the stroller assembly 12 by a lever support 58 extending therebetween. The cable 54 is coupled to a first end of the lever 56, with a second end of the lever projecting beyond lever support 58 substantially as shown in FIG. 4. A plunger 60 is slidably mounted relative to the first axle support stanchion 54 and positioned for abutting engagement with the second end of the lever 56. A spring 62 is interposed between the plunger 60 and a portion of the stroller assembly 12 so as to bias the plunger 60 in a normal upward position. The plunger 60 projects downwardly through a portion of the first axle support stanchion 44 and through an elongated aperture in a guide plate 64 secured to the first axle support stanchion 44. A locking member 66 is secured to a lower distal end of the plunger 60 and positioned for interfering engagement with a portion of the wheels 22 of the first wheel assembly 18. By this structure, the spring 62 operates to bias the plunger 60 into a normal upward position wherein the locking member 66 engages a portion of the wheels 22 such as the spokes thereof to preclude the wheels 22 from rotating relative to the respective axle 46, thereby precluding further motion of the invention 10. It should be noted that the cable 54 extends through the rigid cable conduit 52 and is mechanically coupled to the brake handle 16 through the guide pin 40. By this structure, the brake handle 16 can be manually operated to effect actuation and releasing of the brake means 26 and 28 in a now understood manner.

In use, the safety brake stroller 10 according to the present invention can be easily utilized for precluding motion of a stroller absent and attendant walking therebehind. The present invention 10, because of the specific configuration of the brake means 26 and 28, can be retro-fitted to an existing stroller assembly 12 if so desired. The specific configuration of the brake handle 16 permits an individual to simultaneously operate both brake means 26 and 28 through single motion of the brake handle 16 towards the gripping handle tube 34 as described above.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A safety brake stroller comprising:
   a stroller assembly having a seat, a push handle projecting upwardly from the seat, a first wheel assembly including at least one first wheel, and a second wheel assembly including at least one second wheel, the wheel assemblies permitting rolling traversing of the stroller assembly over a ground surface;
   a brake handle movably mounted relative to the push handle of the stroller assembly;
   a first brake means mounted to the stroller assembly and positioned in mechanical communication via a rigid cable with the brake handle for selectively precluding rotation of the first wheel;
   said brake means configured such that a grasping of the brake handle will effect releasing of the brake means to permit rotation of the wheel of the respective wheel assembly, with the brake means automatically engaging the wheel of the wheel assembly in an absence of a grasping of the brake handle to preclude further motion of the stroller assembly;
   said push handle of the stroller assembly comprising a first vertical handle tube projecting upwardly from the stroller assembly, and a second vertical handle tube projecting upwardly from the stroller assembly into a space orientation relative to the first handle tube; a gripping handle tube extending between the vertical handle tubes and oriented in a substantially horizontal position;
   said brake handle comprising an elongated member having a first handle collar extending from a first end thereof slidably positioned about the first vertical handle tube; and a second handle collar projecting from a second end of the elongated member of the brake handle and slidably positioned about the second vertical handle tube, each of the handle collars including a guide pin projecting through an elongated slot directed through the respective vertical handle tube; and return springs interposed between the respective guide pins and an upper portion of the respective vertical handle tube so as to bias the brake handle into a spaced orientation relative to the gripping handle tube.

2. A safety brake stroller comprising:
   a stroller assembly having a seat, a push handle projecting upwardly from the seat, a first wheel assembly including at least one first wheel, and a second wheel assembly including at least one second wheel, the wheel assemblies permitting rolling traversing of the stroller assembly over a ground surface;
   a brake handle movably mounted relative to the push handle of the stroller assembly;
   a first brake means mounted to the stroller assembly and positioned in mechanical communication with the brake handle for selectively precluding rotation of the first wheel;
   a second brake means mounted to the stroller assembly and positioned in mechanical communication with the brake handle for selectively precluding rotation of the second wheel;
   said brake means configured such that a grasping of the brake handle will effect releasing of the brake means to permit rotation of the wheels of the respective wheel assemblies, with the brake means automatically engaging the wheels of the wheel assemblies in an absence of a grasping of the brake handle to preclude further motion of the stroller assembly;
   said first wheel assembly including a pair of first wheels, and the second wheel assembly includes a pair of second wheels;
   said push handle of the stroller assembly comprising a first vertical handle tube projecting upwardly from the stroller assembly, and a second vertical handle tube projecting upwardly from the stroller assembly into a spaced orientation relative to the first handle tube; a gripping handle tube extending between the vertical handle tubes and oriented in a substantially horizontal position;
   said brake handle comprising an elongated member having a first handle collar extending from a first end thereof slidably positioned about the first vertical handle tube; and a second handle collar projecting from a second end of the elongated member of the brake handle and slidably positioned about the second vertical handle tube, each of the handle collars including a guide pin projecting through an elongated slot directed through the respective vertical handle tube; and return springs interposed between the respective guide pins and an upper portion of the respective vertical handle tube so as to bias the brake handle into a spaced orientation relative to the gripping handle tube.

3. A safety brake stroller comprising:
   a stroller assembly having a seat, a push handle projecting upwardly from the seat, a first wheel assembly including at least one first wheel, and a second wheel assembly including at least one second wheel, the wheel assemblies permitting rolling traversing of the stroller assembly over a ground surface;

a brake handle movably mounted relative to the push handle of the stroller assembly;

a first brake means mounted to the stroller assembly and positioned in mechanical communication with the brake handle for selectively precluding rotation of the first wheel;

a second brake means mounted to the stroller assembly and positioned in mechanical communication with the brake handle for selectively precluding rotation of the second wheel;

said brake means configured such that a grasping of the brake handle will effect releasing of the brake means to permit rotation of the wheels of the respective wheel assemblies, with the brake means automatically engaging the wheels of the wheel assemblies in an absence of a grasping of the brake handle to preclude further motion of the stroller assembly;

said first wheel assembly including a pair of first wheels, and the second wheel assembly includes a pair of second wheels;

said push handle of the stroller assembly comprising a first vertical handle tube projecting upwardly from the stroller assembly, and a second vertical handle tube projecting upwardly from the stroller assembly into a spaced orientation relative to the first handle tube; a gripping handle tube extending between the vertical handle tubes and oriented in a substantially horizontal position;

said brake handle comprising an elongated member having a first handle collar extending from a first end thereof slidably positioned about the first vertical handle tube; and a second handle collar projecting from a second end of the elongated member of the brake handle and slidably positioned about the second vertical handle tube, each of the handle collars including a guide pin projecting through an elongated slot directed through the respective vertical handle tube; and return springs interposed between the respective guide pins and an upper portion of the respective vertical handle tube so as to bias the brake handle into a spaced orientation relative to the gripping handle tube;

said stroller assembly further comprising a first axle support stanchion rotatably mounted to the stroller assembly and projecting therefrom, a first axle supported by the first axle support stanchion, with the pair of first wheels being rotatably mounted to the first axle on opposed sides of the first axle support stanchion; and a second axle support stanchion rotatably mounted to the stroller assembly and projecting therefrom, a second axle supported by the second axle support stanchion, with the pair of second wheels being rotatably mounted to the second axle on opposed sides of the second axle support stanchion.

4. The safety brake stroller of claim 3, wherein the brake means each comprise a rigid cable conduit secured to a portion of the stroller assembly; a cable extending through the rigid cable conduit and being coupled to the brake handle; a lever pivotally supported at a medial portion thereof relative to a portion of the stroller assembly, the cable being coupled to a first end of the lever, with a second end of the lever projecting beyond a pivotal mounting of the lever; a plunger slidably mounted relative to the first axle support stanchion and positioned for abutting engagement with the second end of the lever; a spring interposed between the plunger and a portion of the stroller assembly so as to bias the plunger in a normal upward position, the plunger projecting downwardly; a locking member secured to a lower distal end of the plunger and positioned for interfering engagement with a portion of the wheels of the respective wheel assembly such that the spring operates to bias the plunger into the normal upward position wherein the locking member engages the portion of the respective wheels to preclude the wheels from rotating relative to the respective axle.

* * * * *